United States Patent [19]

Dromigny et al.

[11] Patent Number: 4,686,076
[45] Date of Patent: Aug. 11, 1987

[54] METHOD, MACHINE AND MOLD FOR FABRICATING CONTAINERS, MADE FROM AN INJECTED MATERIAL, WITH A FILM FORMING AN EXTERNAL COATING

[76] Inventors: Pierre Dromigny, 54 avenue de Versailles, 75016 Paris, France; Théodore Schöttli, Formenbau, CH 8253 Diessenhofen, Switzerland

[21] Appl. No.: 877,756

[22] Filed: Jun. 24, 1986

[51] Int. Cl.⁴ .................. B29C 31/08; B29C 33/14
[52] U.S. Cl. .................... 264/268; 264/275; 425/127; 425/400; 425/444; 425/112; 425/397
[58] Field of Search ............. 264/268, 275; 425/127, 425/400, 444, 397, 112

[56] References Cited

U.S. PATENT DOCUMENTS

| | | | |
|---|---|---|---|
| 2,004,530 | 6/1935 | Howe et al. | 425/400 |
| 2,811,744 | 11/1957 | Baldanza | 425/127 |
| 3,153,262 | 10/1964 | Stekette | 425/444 |
| 3,247,550 | 4/1966 | Haines, Jr. | 264/275 |
| 3,757,718 | 9/1973 | Johnson | 425/400 |
| 4,076,790 | 2/1978 | Lind et al. | 264/268 |
| 4,269,579 | 5/1981 | Thomas | 425/112 |
| 4,518,554 | 5/1985 | Hatakeyama et al. | 425/127 |
| 4,576,566 | 3/1986 | Hain | 425/400 |

FOREIGN PATENT DOCUMENTS 2210504 12/1974 France.

*Primary Examiner*—Tim Miles
*Attorney, Agent, or Firm*—Fisher, Christen & Sabol

[57] ABSTRACT

A method, machine and mold are provided for fabricating, by injection of synthetic material, containers having a film forming an external coating. The machine includes a mold, an injection nozzle, a film feed device, and means for holding the film against the male element of the mold; and wherein the injection nozzle is carried by the male element of the mold and said holding means comprise a slider in the cavity of the female element movable, under the action of the male element, against a return force.

9 Claims, 4 Drawing Figures

METHOD, MACHINE AND MOLD FOR FABRICATING CONTAINERS, MADE FROM AN INJECTED MATERIAL, WITH A FILM FORMING AN EXTERNAL COATING

BACKGROUND OF THE INVENTION

1. Field of the Invention

The present invention relates to a method, a machine and a mold for fabricating, by injection of synthetic material, containers having a film forming an external at least partial coating and forming an integral part of the containers, and the containers thus obtained.

2. Description of the Prior Art

When it is desired, in particular, to decorate such containers obtained by injection of synthetic material, or to apply thereto indications relating more particularly to the composition of the product contained, a current technique includes printing the decoration and the indications directly on the container already produced. This technique has numerous drawbacks because more particularly of the poor quality of printing on the material, generally polypropylene or similar, of the container, and because of the need for an additional operation for doing this, which operation increases the costs and the manufacturing time.

To overcome these drawbacks, synthetic material is injected on a printed film, cut out previously to the desired format, which is placed in the mold before injection. In this case, very good printing qualities can be obtained and the pellicule is incorporated in the container at the same time as this latter is manufactured, without loss of time and without additional cost.

Thus, French Pat. No. 2 210 504, particularly, discloses a method of incorporating a thin film of material in an object made from a thermoplastic material; the object being made by means of an injection machine including more particularly a mold formed of a male punch element and a female die element, and at least one synthetic material injection nozzle. More particularly, the method includes the following steps:

feeding the mold with films previously cut out to the desired format, holding the film applied against the male element during closure of the mold; and injecting synthetic material in the space left between the male and female elements when said mold is closed.

Referring to the accompanying FIG. 1 illustrating this prior art, the mold 1 used for implementing this method comprises a punch 2 and a die 3. The synthetic material injection nozzle 4 is provided in the die 3 and opens into the central zone at the bottom of the cavity of the die; said zone being formed as an arcuate part 5 projecting outwardly. This arcuate part 5 is arranged so as to be housed in the corresponding concave recess 6 in the punch 2. This latter has slits or openings 7, connected to a suction system not shown, for holding the film 8 against the punch during closure of the mold. Thus, in this case, when the film must be on the outside of the container, this latter, as illustrated in FIG. 1, must have a central hole through which the synthetic material is injected.

The synthetic material thus injected between the punch and the film applies this latter against the walls of the die, while forming a container of which the film, forming for example a label or a decoration, forms an integral part.

The essential disadvantage of this method resides as has been seen, in the need to form a recess in the film for passing the injected material therethrough. That requires an additional step in forming the film, whence a loss of time and increase in cost. The advantage of using a preinjected film is therefore largely reduced for this reason. Furthermore, such a hole is unesthetic and makes the use of the film as label impractical. In fact, the indications concerning for example the composition of the product, which are generally printed on the part of the film covering the bottom of the container, are interrupted by this hole.

The purpose of the present invention is precisely to overcome this drawback by proposing a method, a machine and a mold for fabricating containers, made from an injected material, including an external coating film forming an integral part of the container, without it being necessary to form a central hole in said film.

SUMMARY OF THE INVENTION

For this, the present invention provides a method of fabricating, by injection of synthetic material, containers having a film forming an external at least partial coating and forming an integral part of the containers, by means of an injection machine including more particularly a mold formed of a male punch element and a female die element, and at least one synthetic material injection nozzle, said method comprising the following steps:

feeding the mold with films precut to the desired format;

holding the film applied against the male element during closure of the mold;

injecting synthetic material in the space left between the male and female elements when said mold is closed, in which method, during closure of the mold, the film is held at least partially against the male element by the constant bearing force against the face of the film opposite the female element of a slider housed in the cavity formed by the female element and projecting, in the open position of the mold, and movable under the action of the male element, in the advancing direction theeof, against the return force; the synthetic material being injected from the male element and against the face of the film opposite the male element.

According to another characteristic of the invention, the synthetic material is injected into the central zone of the end of the male element; the injected material applying the covering or coating against the walls of the cavity of the female element of the mold, and completely pushing the head of the slider back into the housing provided in the bottom of said cavity.

The present invention also relates to a machine for fabricating, by injection of synthetic material, of containers having a film forming an external at least partial coating and forming an integral part of the containers, of the type including:

a mold formed of a male punch element capable of cooperating with a female die element;

at least one nozzle for injecting the synthetic material in the space left between said male and female elements in the closed position of the mold;

a device for feeding said mold with precut films; and means for holding the film against the element during closure of the mold, wherein the synthetic material injection nozzle is carried by the male element and the holding means comprise at least one slider housed in the cavity formed by the female element, projecting in the open position of the mold and adapted for cooperating with the male element for holding the film against this latter during closure of the mold, said slider being movable, under the action of the male element, in the advancing direction of this latter against a return force. According to another characteristic of the invention, the above mentioned slider includes a rod one end of which is connected to a return force generator, such more especially as a piston slidable in a cylinder provided beyond the cavity of the female element, in the advancing direction of the male element, a spring or similar, and whose other end carries a flattened head adapted to come to bear against the face of the film opposite the female element. In particular, the axis of said slider is at least substantially parallel to the advancing direction of the male element of the mold, and merges more particularly with the central axis of the cavity of the female element.

According to another characteristic of the invention, the bottom of the cavity of the female element includes a housing for the head of the slider.

In addition, the injection nozzle may be provided in the body of the male element of the mold so as to open at least substantially in the center of the end of the male element opposite the female element, namely opposite the head of the slider.

According to yet another characteristic of the invention, the film feed device is disposed generally above the mold and includes a carriage integral with the frame carrying the male element of the mold and forming, at its upper part, a magazine for the precut films and, at its lower part, a temporary retaining means for a film, said carriage being slidable over a slide and its front face having therein an orifice for passing a suction nozzle for the films the slide being provided at its distal end, with respect to the carriage in the open position of the mold, with a slot for passing films one by one; said slide being connected, at this end, to uprights integral with the frame of the female element of the mold and having grooves in which the films may slide as far as stops provided on the uprights for retaining a film opposite the cavity of the mold.

BRIEF DESCRIPTION OF THE DRAWINGS

The present invention will be better understood and other details, characteristics and advantages thereof will appear more clearly from the following explanatory description with reference to the accompanying schematical drawings illustrating a preferred embodiment of the invention and in which.

DESCRIPTION OF THE PREFERRED EMBODIMENT

Figure 1:
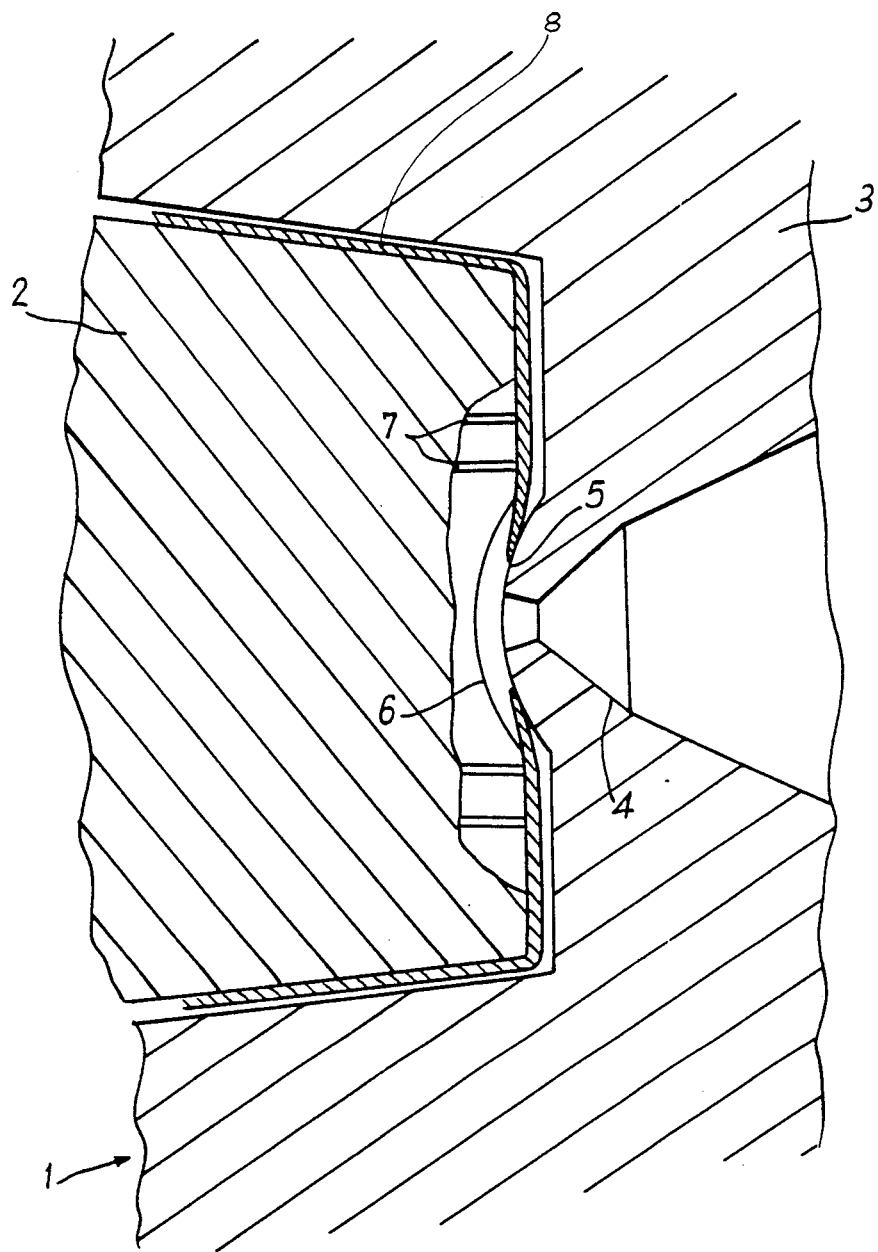
FIG. 1 is a partial view in longitudinal section of the prior art mold.
Figure 2:
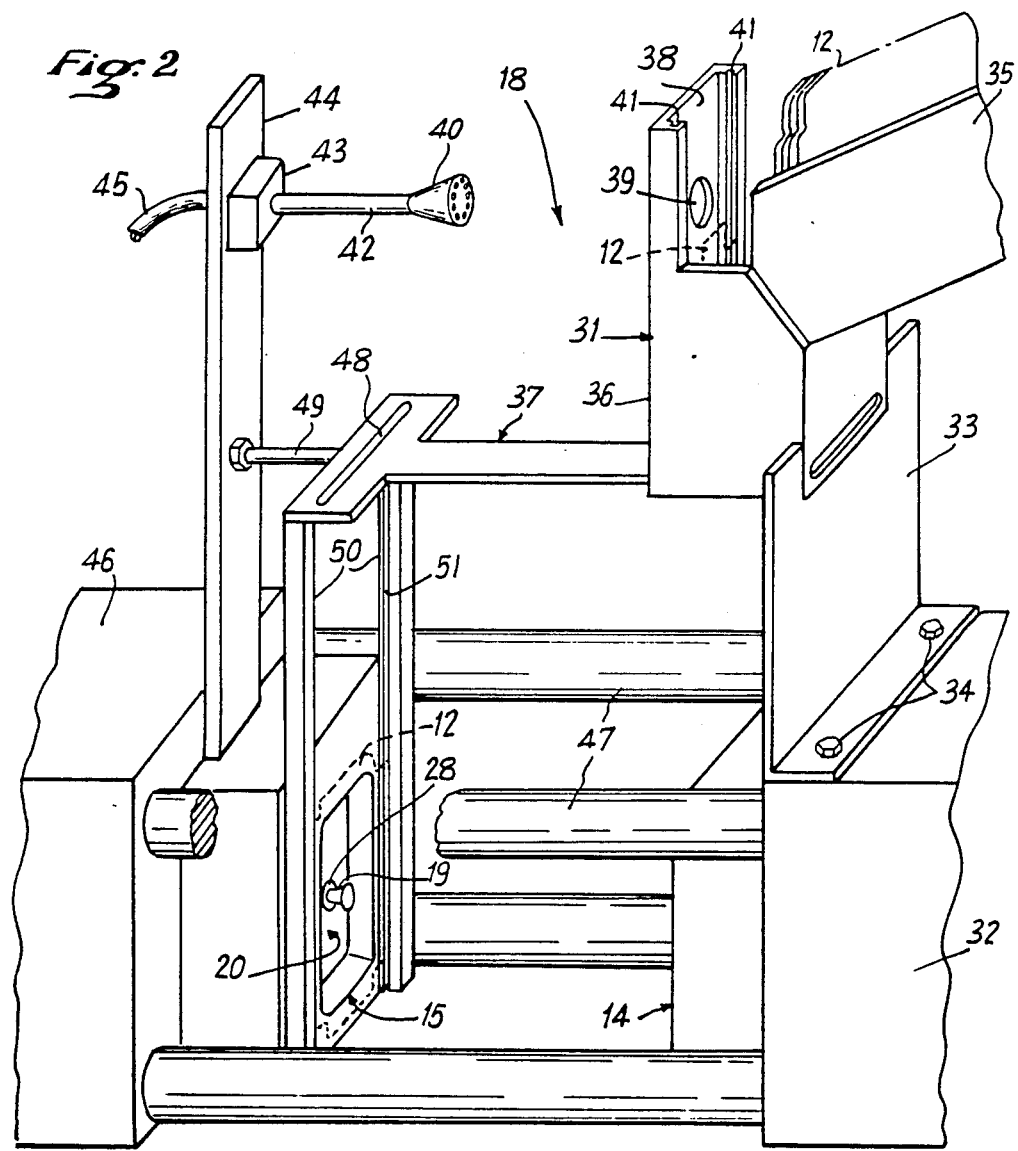
FIG. 2 is a schematical perspective view of a machine for fabricating containers from an injected material in accordance with the invention
Figure 2:
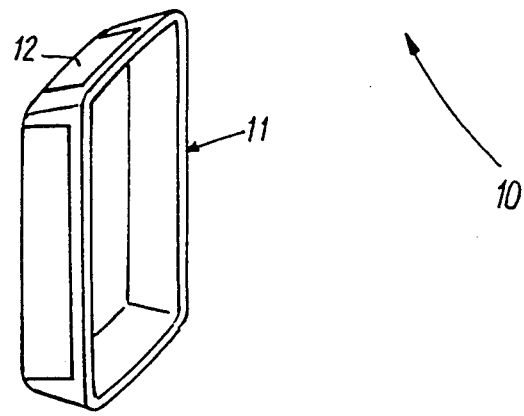

The machine of the invention is meant for fabricating, by injection of a synthetic material such more particularly as polypropylene or similar, containers 11 having a film 12 forming an external at least partial coating and being an integral part of the containers 11 (it will be noted in FIG. 2 that container 11 is shown on a larger scale than the machine 10). Machine 10 includes a mold 13 formed of a male punch element 14 adapted for cooperating with a female die element 15; at least one nozzle 16 for injecting the synthetic material in the space 17 left between the male 14 and female 15 elements, in the closed position of the mold 13; a device 18 for feeding films 12 into the mold 13; and means 19 for holding the film against the male element 14 during closure of the mold 13.

In particular, in accordance with the invention, the synthetic material injection nozzle 16 is carried by the male element 14 and the holding means comprise at least one slider 19 housed in the cavity 20 formed by the female element 15, so as to project, in the open position of mold 13, into this cavity. Slider 19 is adapted for cooperating with the male element 14 for holding the film 12 against this latter during closure of the mold, said slider 19 being movable, under the action of the male element 14, in the advancing direction of this latter, against a return force.

The slider 19 includes a rod 21, one end 22 of which is connected to a return force generator. As illustrated, this generator may be formed of a piston 23 slidable in a cylinder 24 provided beyond the cavity 20 of the female element 15, in the advancing direction of the male element 14. Cylinder 24 includes, in its bottom part, means 25 for introducing and discharging an appropriate fluid, connected to a fluid source not shown. The piston and the cylinder may be replaced by any other similar appropriate means, such more especially as a spring. The other end 26 of rod 21 of slider 19 has a flattened head 27 adapted to come to bear against the face 12b of the film 12 opposite the female element 15.

Generally, the axis of slider 19 is at least substantially parallel to the advancing direction of the male element 14 of mold 13 during closure thereof, and merges more particularly with the central axis of the cavity 20 of the female element 15.

In the bottom of this cavity 20 of the female element 15 is provided a housing 28 for the head 27 of slider 19, in the closed position of the mold.

As shown, the injection nozzle 16 is provided in the body 29 of the male element 15 of mold 13 and opens out at least substantially in the center of the end 30 of the male element 15 opposite the female element 14, that is to say opposite the head 27 of slider 19.

Of course, depending on the shape of the container to be formed, the male and female elements of the mold will have different shapes. In the example illustrated more particularly in FIG. 2, adapted for forming trays with a substantially rectangular parallelepipedic shape, the cavity of the female element of the mold has a form adapted for obtaining this type of container, that is to say a rectangular parallelepipedic shape, the male element of the mold having similarly a corresponding shape.

Referring now more particularly to FIG. 2, the film feed device 18 is disposed generally above mold 13 and has a carriage 31 firmly fixed to frame 32 carrying the male element 14 of the mold. This fixing may be obtained more particularly by means of a plate 31 fixed to frame 32 by appropriate fixing means 34, such more particularly as screws, bolts or similar, as well as to the carriage 31 by any appropriate fixing means (not shown). At the upper part of carriage 31 a magazine 35 is provided for the precut films 12, whereas its lower part 36 is formed so as to retain temporarily one of said films. The carriage 31 may slide over a slide 37 and has an orifice 39 formed in its front face 38 for passing a film suction nozzle 40 therethrough. In addition, grooves 41 are provided, on the inner side of said carriage, along the edges of the front face 38 thereof. The suction nozzle 40 is extended by a rod 42 passing through a case 43 mounted on a support beam 44 fixed to the frame 46 of the female element 15 of mold 13. Rod 42 of nozzle 40 is connected to a suction duct 45, itself connected to a vacuum source (not shown). It will be noted that the frames 32 and 46 of the male 14 and female 15 elements of the mold are connected by sliding rods 47 for opening and closing the mold.

At its distal end, with respect to carriage 31, slide 37 has, in the open position of the mold, a slot 48 for passing films therethrough one by one; said slide 37 being fixed at its end to beam 44 by a rod 49 and being connected, at this same end, to uprights 50 secured to the frame 46 of the female element 15 of the mold and having grooves 51 in which the films may slide as far as stops (not shown) adapted depending on the particular shape of the films and provided so as to retain each film opposite the cavity 20 of the female element 50 of the mold.

The operation of the machine of the invention will now be explained.

The films 12 precut to the desired format are stored in the magazine 35 provided at the upper part of carriage 31, one behind the other and facing the front face 38 of the carriage. In the example shown, the films are in the form of a cross with a central rectangular part and lateral rectangular foldable flaps. It is obvious that any other desirable shape may be used. Nevertheless, the embodiment illustrated of the machine of the invention is more particularly adapted to the shape of the films shown, more particularly in so far as the device 18 for feeding same is concerned.

The feed device 18 operates in synchronism with the opening and closing of mold 13 in the following way.

From the initial open position of the mold shown in FIG. 2, during closure thereof, carriage 31, secured to frame 32 of the mobile male element 14 of the mold will slide along slide 37 until it is at the level of the widened part thereof including the slot 48. In this position, since the suction nozzle 40 has passed through the orifice 39 provided in the front face 38 of the carriage 31, it is situated close to the first film in the magazine 35 which it sucks. Since the film curves slightly it is applied on the one hand against nozzle 40 and, on the other hand, is engaged by its side flaps in the grooves 41 provided in the edges of the front face 39 of the internal side of carriage 31 and which face each other. When the mold opens again the suction nozzle 40 moves away from the film which it held applied thereagainst and the film falls by gravity into the lower part 36 of carriage 31 while sliding in grooves 41, in which lower part 36 it is retained in the position shown with broken lines in FIG. 2.

During the following cycle, when the mold is closed, this film passes into slot 48 (carriage 31 being placed immediately thereabove) and slides between the uprights 50 in grooves 51, whereas another film is sucked by nozzle 40. During the consecutive opening of the mold, the first film is positioned opposite cavity 20 of the female element 15 of the mold because of the stops which stop it in the required position (shown with dotted lines in FIG. 2), whereas the second film remains in a waiting position in the lower part 36 of carriage 31.

The operation of mold 13, properly speaking, will now be more particularly described.

Figure 3:
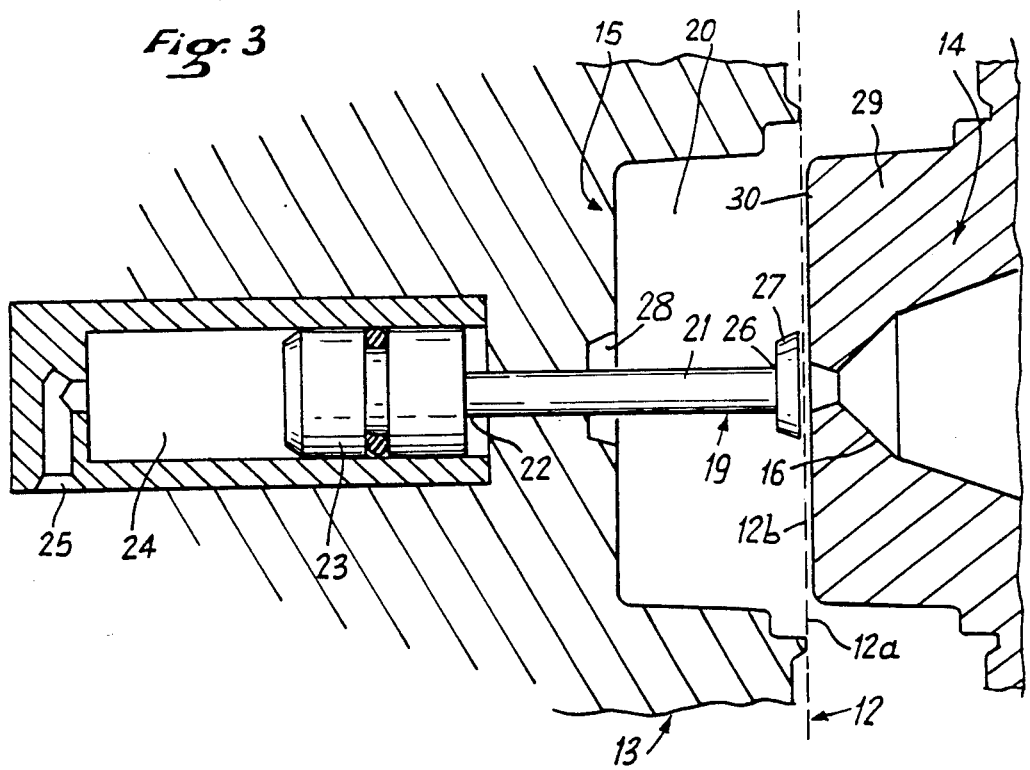
FIG. 3 is a partial view in longitudinal section of the mold of the invention in the open position and FIG. 4 is a partial view in longitudinal section of the mold of the invention in the closed position.
Figure 4:
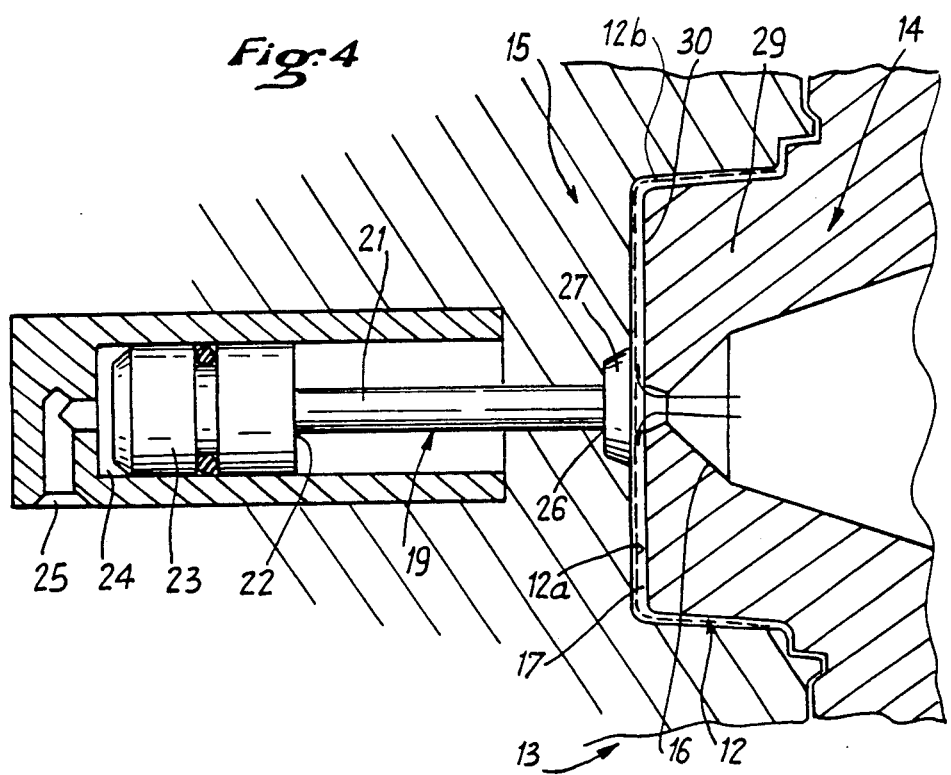

Referring to FIGS. 3 and 4, with a film 12 placed in front of the female element 15 of mold 13 in the way described above, the mold-film assembly is in the position illustrated in FIG. 3, that is to say corresponding to the opening of the mold; the head 27 of slider 19, in this position, being slightly set back with respect to the film 12. In a first step, the mold is closed by the advance of the mobile male part 14 of the mold 13 into the cavity 20 of the female part 15. During closure of the mold 13, film 12 is held against the male element 14, at least partially, by the constant bearing force applied against the face 12b of film 12 opposite the female element 15 by the head of slider 19 which moves under the action of the male element 14, in the advancing direction thereof, against the return force exerted on the piston 23. Thus, as the male element 14 advances into the cavity 20 of the female element 15, slider 19 retracts and penetrates into the base of the female part 15, and more particularly into cylinder 24; until the mold 13 reaches its closed position shown in FIG. 4. At this moment, because of the space which is left between the male and female elements for injecting synthetic material, the film is not perfectly applied against the walls of cavity 20 of the female element and the head of the slider, on which the film bears, extends slightly from its housing 28 provided in the bottom of cavity 20. Synthetic material is then injected, by the injection nozzle 16, into the central zone of the end 30 of the male element 14 of mold 13. Any appropriate synthetic material may of course be used, such for example as polypropylene at about 200° C. The synthetic material injected against the face 12a of film 12 opposite the male element 14 applies the film 12 against the wills of the cavity 20 of the female element 15 of mold 13 and, at the same time, pushes the head of slider 19 completely into its housing 28, so that the film 12 is in fact incorporated in the external face of the container formed, while forming an integral part thereof.

Finally, during the consecutive opening of the mold, the recipient 11 may be discharged from the cavity 20 of the female element of the mold and be gathered up at the same time as slider 19 resumes its initial extended position under the action of the above mentioned return force, the discharge being able to be provided more especially by said slider.

It is obvious that any appropriate material may be used for forming the films, that is to say more particularly compatible with the printing of a decoration or practical indications, as well as with incorporation in the material of the container considered. In particular, the films may be made from the same material as that of the container, such for example as polypropylene or also paper.

What is claimed is:

1. In a method for fabricating, by injection of synthetic material, containers having a film forming an external at least partial coating and forming an integral part of the containers, by means of an injection machine including, more particularly, a mold formed of a male punch element and a female die element and at least one nozzle for injecting synthetic material, said method including the following steps:

feeding the mold with films precut to the desired format;

holding the film applied against the male element during closure of the mold; and injecting synthetic material in the space left between the male and female elements when said mold is closed, wherein during closure of the mold, the film is held against the male element, at least partially by a constant bearing force applied against the face of the film opposite said female element by a slider housed in the cavity formed by the female element, projecting in the open position of the mold and movable under the action of the male element in the advancing direction thereof, against a return force; and synthetic material is injected from the male element and against the face of the film opposite said male element.

2. The method as claimed in claim 1, wherein synthetic material is injected into the central zone of the end of the male element; the injected material applying the film against the walls of the cavity of the female element of the mold and pushing the head of the slider back into a corresponding housing provided in the bottom of said cavity.

3. The machine for fabricating, by injection of synthetic material, containers including a film forming an external at least partial coating and forming an integral part of the containers, of the type including:
   a mold formed of a male punch element adapted for cooperating with a female die element;
   at least one nozzle for injecting synthetic material into the space left between said male and female elements in the closed positions of the molds;
   a device for feeding precut films into said mold; and
   means for holding the film against the male element during closure of the mold, wherein the synthetic material injection nozzle is carried by the male element of the mold; and said holding means comprise at least one slider housed in the cavity formed by the female element, projecting in the open position of the mold and adapted for cooperating with the male element for holding the film thereagainst during closure of the mold, said slider being movable under the action of the male element, in the advancing direction thereof, against a return force.

4. The machine as claimed in claim 3, wherein said film feed device is disposed generally above the mold and includes a carriage, secured to the frame carrying the male element of the mold and having, in its upper part, a magazine for the precut films and, in its lower part, a temporary retention means for a film, said carriage being slidable over a slide and having its front face with an orifice therein for passing a film suction nozzle therethrough; the slide having, at its distal end with respect to the carriage and in the open position of the mold, a slot for passing films therethrough one by one; said slide being connected at its end to uprights secured to the frame of the female element of the mold and having grooves in which the films may slide.

5. A mold for fabricating, by injecting synthetic material, containers having a film forming an external at least partial coating and forming an integral part of the containers, of the type including:
   a male punch element adapted for cooperating with a female die element;
   at least one nozzle for injecting the synthetic material into the space left between said male and female elements in the closed position of the mold; and
   means for holding the film against the male element during closure of the mold; wherein said synthetic material injection nozzle is carried by the male element; and said holding means comprise at least one slider housed in the cavity formed by the female element, projecting in the open position of the mold and adapted for cooperating with said male element for holding the film thereagainst during closure of the mold, said slider being movable under the action of the male element, in the advancing direction thereof, against a return force.

6. The mold as claimed in claim 5, wherein said slider includes a rod one end of which is connected to a return force generator, such more particular as a piston adapted for sliding in a cylinder provided beyond the cavity of said female element, in the advancing direction of the male elements, a spring or similar and whose other end has a flattened head adapted to come to bear against the face of the film facing said female element.

7. The mold as claimed in claim 5, wherein the axis of said slider is at least substantially parallel to the advancing direction of the male element of the mold, and merging more particularly with the central axis of the cavity of the female element.

8. The mold as claimed in claim 6, wherein the bottom of the cavity of the female element has a housing for the head of the slider.

9. The mold according to claim 6, wherein the injection nozzle is provided in the body of the male element of the mold and opens out at least substantially in the center of the end of the male element opposite the female element that is to say facing the head of the slider.

* * * * *